United States Patent
Kuwa (10) Patent No.: US 7,803,291 B2
(45) Date of Patent: Sep. 28, 2010

(54) PLASTIC LENS, MANUFACTURING METHOD THEREOF, PRODUCTION TRACING MANAGEMENT METHOD THEREOF, AND OPTICAL PICKUP DEVICE

(75) Inventor: Tadahiro Kuwa, Tsukuga-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 12/216,775

(22) Filed: Jul. 10, 2008

(65) Prior Publication Data

US 2009/0008809 A1    Jan. 8, 2009

Related U.S. Application Data (62) Division of application No. 10/721,458, filed on Nov. 26, 2003, now Pat. No. 7,426,078.

(30) Foreign Application Priority Data

Nov. 26, 2002   (JP) ............................. 2002-342775

(51) Int. Cl.
    *B29D 11/00*   (2006.01)
(52) U.S. Cl. .................................... 264/1.32
(58) Field of Classification Search ................. 264/1.32
    See application file for complete search history.

(56) References Cited

U.S. PATENT DOCUMENTS

| 5,995,304 | A | * | 11/1999 | Nomura et al. | ............. 359/726 |
| 6,055,111 | A | * | 4/2000 | Nomura et al. | ............. 359/642 |
| 6,078,430 | A | | 6/2000 | Fukuda et al. | |

| 2001/0017733 | A1 | 8/2001 | Asakura |

FOREIGN PATENT DOCUMENTS

| JP | A-63-121802 | 5/1988 |
| JP | U-3-9820 | 1/1991 |
| JP | U-5-96034 | 12/1993 |
| JP | A-9-197239 | 7/1997 |
| JP | A-9-309156 | 12/1997 |
| JP | A-11-16197 | 1/1999 |
| JP | A-2000-111709 | 4/2000 |
| JP | A-2001-34991 | 2/2001 |
| JP | A-2001-71332 | 3/2001 |
| JP | A-2002-22907 | 1/2002 |
| JP | A-2002-62409 | 2/2002 |
| JP | A-2002-90137 | 3/2002 |
| JP | A-2002-113725 | 4/2002 |
| JP | A-2002-122711 | 4/2002 |
| JP | A-2002-154139 | 5/2002 |
| JP | A-2002-200652 | 7/2002 |
| JP | A-2002-200654 | 7/2002 |

OTHER PUBLICATIONS

Nov. 4, 2009 Office Action for Japanese Patent Application Publication No. 2003-390156 (with translation).
Jan. 12, 2010 Office Action for Japanese Patent Application No. 2009-285048 (with translation).
Feb. 2, 2010 Office Action for Japanese Patent Application No. 2003-390154 (with translation).

* cited by examiner

*Primary Examiner*—Kat Wyrozebski
*Assistant Examiner*—Xue Liu
(74) *Attorney, Agent, or Firm*—Oliff & Berridge, PLC (57) ABSTRACT

A lens has a flange part at the outer periphery of its surface. A flange surface of the flange part is higher than the lens surface. The flange surface has a marking to identify a production jig, for example.

21 Claims, 6 Drawing Sheets

PLASTIC LENS, MANUFACTURING METHOD THEREOF, PRODUCTION TRACING MANAGEMENT METHOD THEREOF, AND OPTICAL PICKUP DEVICE

CROSS-REFERENCE TO RELATED APPLICATION

This is a Division of application Ser. No. 10/721,458 filed Nov. 26, 2003, which claims priority from Japanese Patent Application Serial No. 2002-342775. The disclosures of the prior applications are hereby incorporated by reference herein in their entirety.

BACKGROUND

The present invention relates to a plastic lens used in optical elements such as cameras and optical disc apparatus, a manufacturing method of the same, a production tracing management method for a plastic lens, and an optical pickup device having a plastic lens.

Digital cameras and optical disc apparatus have been spread. The optical disc apparatus, for example, have an optical pickup device for reading information stored on an optical storage medium. The optical pickup device has a pickup lens for focusing light from a light source on the optical storage medium.

The pickup lens is generally manufactured by molding glass or plastic such as polyolefin resin or acrylic resin. A plastic pickup lens is produced by injection molding, transfer molding, or other molding techniques using a mold. In an injection molding process, for example, resin is poured into a cavity in the mold through a gate and allows it to cool to solidify, thereby producing a pickup lens.

This kind of plastic lenses are mass-produced to reduce unit price. Thus, a plurality of lenses are simultaneously produced using a mold having a plurality of cavities. For example, eight lenses are produced at a time using a mold having eight cavities. Though the quality of the lens formed in each cavity is preferably the same, it may vary in practice. Further, the quality may vary by mold and molding device.

A technique of marking a plastic lens is disclosed in Japanese Unexamined Patent Application Publication No. 2002-122711, and United States Patent Application Publication No. 2001/0017733, Asakura, for example. To distinguish a lens surface, this technique deposits a coating film that serves as a marking on the peripheral area of one lens surface by printing, coating, or evaporation. Thus, the material of the lens and the marking are different; therefore, this technique further requires a marking process in addition to a lens molding process when producing a lens by injection molding.

Another marking technique for another object is disclosed in Japanese Unexamined Patent Application Publication No. 2000-111709. This technique creates a convexity or concavity on a flange surface of an optical component to indicate a resin injection position. No mention is made to a manufacturing method nor mold used in this technique. Since the convexity or concavity is placed on the upper surface of the flange part, however, the marking is likely to chip away or get contaminated when put on a desk or by handling. This causes to fail to convey marking information properly. Besides, the whole purpose of the marking described in this technique is to align the position of a gate, not to identify a lens nor track the production of the lens during the production process. This is obvious from the fact that the marking is formed only in one place, thus unable to distinguish between a plurality of lenses. In addition, the convex marking in the structure shown in FIG. 5 of the publication projects above the upper flange surface by 0.1 to 0.5 mm. Thus, the lens is unstable when placed with the surface having the convex marking facing down. Further, the convex marking can chip away by contact with another component. The concavity formed at the upper flange surface, on the other side, is likely to suffer from accumulation of contamination, for example glue, which reduces visibility. It is therefore preferred that the marking is visible even if it is formed at the other portion than the flange surface, and it does not touch another component. These references are incorporated herein.

As described earlier, the quality of lenses produced by molding may vary by mold or cavity. This raises the need for quality control, production management, and production tracing of a lens after mounted on an optical device. It is thus preferred to create a marking on a lens itself to identify a production jig such as a mold and a cavity or a production line process. The creation of the marking, however, should not deteriorate the performance of the lens. The lens is an optical component, and certain performance is required accordingly. Creating the marking on an optical functional part at the center of the lens, for example, should be avoided since this has an adverse effect on the optical function.

Further, if a marking is broken by abrasion with another component, it not only reduces visibility of the marking, but also deteriorates the optical performance of the optical functional part due to a broken dust attached thereto.

SUMMARY

An object of the present invention is to provide a plastic lens having a marking optimally created thereon, an optical pickup device, and a manufacturing and production management method of the lens suitable for integrally molding such a marking by injection molding.

To these ends, according to the present invention, there is provided a plastic lens produced by injection molding of resin material, including a flange part on a periphery of a lens surface, a flange surface on at least one side of the flange part having a part higher than the lens surface and a depressed part formed on at least a part thereof; and a marking integrally molded by injection molding to a marking surface of the depressed part, a highest point of the marking being lower than a highest point of the flange surface.

Preferably, the flange part has a cutout portion in an outer side surface thereof. Further, the flange surface is preferably mirror-finished at least in a vicinity of an area where the marking is formed.

According to the present invention, there is provided a plastic lens produced by injection molding of resin material, including a flange part on a periphery of a lens surface, a flange surface on at least one side of the flange part having a part higher than the lens surface; and a marking integrally molded to the flange surface by injection molding, for identifying a production jig used to produce the lens.

Preferably, a highest point of the marking is lower than a highest point of the flange surface. The marking is preferably formed in a depressed part of the flange surface. Further, it is preferred that the flange part has a cutout portion in an outer side surface thereof. The flange surface is preferably mirror-finished at least in a vicinity of an area where the marking is formed.

According to the present invention, there is provided an optical pickup device having the above described lens.

According to the present invention, there is provided a method of manufacturing a plastic lens produced by injection molding of resin material in a mold cavity, the lens having a marking on a different part from an optical functional part. The method includes the steps of providing a mold part for one side comprising a first mold member and a second mold member, the first mold member and the second mold member forming a part of the mold cavity; providing a mold part for other side to form the mold cavity cooperable with the mold part for one side when assembled; injecting resin material into the mold cavity; forming the optical functional part of one side of the lens, with the first mold member; and forming the different part of one side of the lens than the optical functional part and the marking thereon, with the second mold member.

Preferably, the different part of one side of the lens than the optical functional part has a flange part on a periphery of a lens surface. A boundary between the first mold member and the second mold member is preferably located near an innermost periphery of the flange part of the lens. The flange part of the lens preferably has a depressed part on at least a part thereof and a marking integrally molded to the depressed part by injection molding. Further, it is preferred that the flange part of the lens includes a flange surface on at least one side of the flange part having a part higher than the lens surface and a depressed part on at least a part thereof, and a marking integrally molded by injection molding to a marking surface of the depressed part, a highest point of the marking being lower than a highest point of the flange surface. Furthermore, the flange surface preferably has a cutout portion in an outer side surface thereof. The flange surface of the flange part is desirably mirror-finished at least in a vicinity of an area where the marking is formed.

According to the present invention, there is provided a method of tracing production of a plastic lens produced by injection molding of resin material. The method includes the step of manufacturing the plastic lens comprising a flange part on a periphery of a lens surface, a flange surface on at least one side of the flange part having a part higher than the lens surface, and a marking integrally molded to the flange surface by injection molding; and the step of tracing production of the lens by use of the marking formed on the lens.

According to the present invention, there is provided another method of tracing production of a plastic lens produced by injection molding of resin material. The method includes the step of manufacturing the plastic lens comprising a flange part on a periphery of a lens surface, a flange surface on at least one side of the flange part having a part higher than the lens surface, and a marking integrally molded to the flange surface by injection molding, a highest point of the marking being lower than a highest point of the flange surface; and the step of tracing production of the lens by use of the marking formed on the lens.

Preferably, each position of the marking formed on each lens is circumferentially different on the flange surface to distinguish production of one lens from another. Further, it is preferred that each shape of the marking formed on each lens is different to distinguish production of one lens from another.

According to the present invention, there is provided a mold for manufacturing a plastic lens produced by injection molding of resin material and having a marking on a part different from an optical functional part. A mold at a side where a marking will be formed includes a first mold member to form an optical functional part of one side of the lens, and a second mold member to form a part different from the optical functional part of one side of the lens. The second mold member is separatable from the first mold member and has a portion to form the marking.

The present invention can provide a lens where a marking for production tracing is created in the most effective way, a manufacturing method thereof, and an optical pickup device.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF EMBODIMENTS

Embodiment 1

A lens according to the first embodiment of the present invention will be explained hereinafter, taking a pickup lens as an example, with reference to FIGS. 1A, 1B, and 2.

Figure 1A:
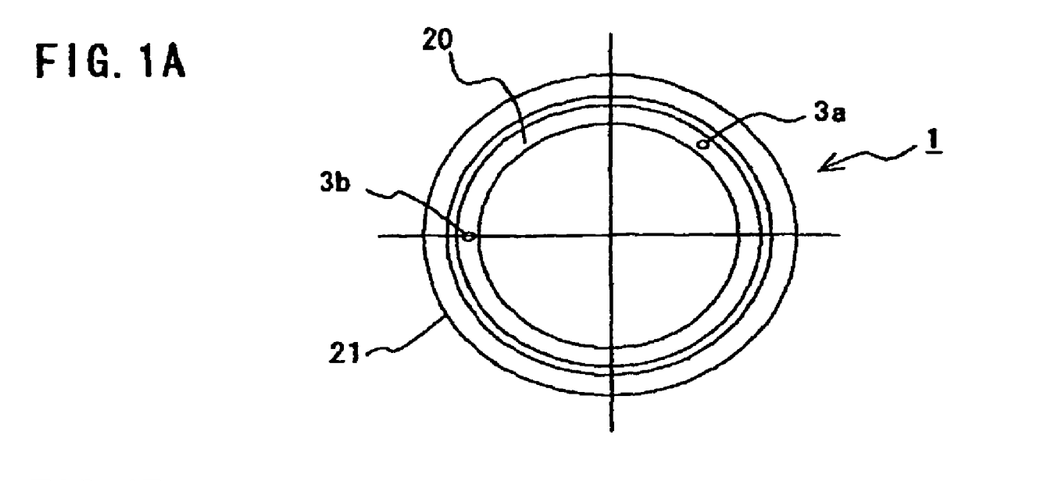
FIGS. 1A and 1B are a top plan view and a side plan view, respectively, of a lens according to the present invention.

FIG. 1A is a top plan view of a lens 1. FIG. 1B is a side plan view of the lens 1, and the left half shows a cross-section of the lens. As shown therein, a flange part 2 is formed on the outer periphery of the lens 1. The flange part 2 has an upper flange surface 21, which faces toward an optical recording medium when the lens 1 is mounted on an optical disc apparatus to read information from the optical recording medium. The other side is a lower flange surface 23. The flange part 2, which is strip-shaped, is placed on the entire periphery of an optical functional part of the lens 1. The flange part 2 is not necessarily completely around the periphery, and it may have a notch at a part of the periphery.

Figure 1B:
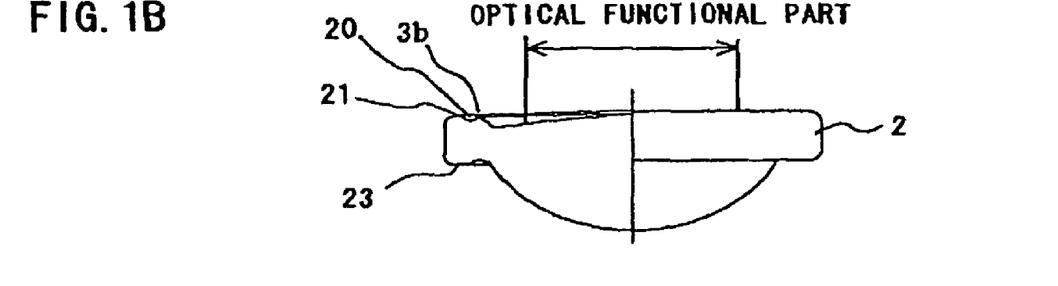

As shown in FIG. 1B, the highest part of the upper flange surface 21 is higher than the upper surface of the optical functional part in the optical axis direction. Thus, when the lens 1 is placed on a desk or so on with the upper flange surface 21 facing down, the upper flange surface 21, not the optical functional part, touches the desk. This prevents the optical functional part from being damaged by contact with a desk and the like. This also prevents it from being damaged by direct contact with an optical recording medium after the lens 1 is mounted to an optical disc apparatus.

The lens 1 in this example has a diameter of 5.8 mm, including the flange part 2. The flange part 2 has a vertical width of 0.9 mm. A lens in another example has a diameter of 3.8 mm.

As shown in FIG. 1A, the upper flange surface has a depressed part 20. Markings 3a and 3b are created in two different positions on the depressed part 20. The markings are used to identify a production jig such as a mold, a cavity, or an injection molder. The markings 3a and 3b are formed not to be higher than the highest part of the upper flange surface 21. The markings 3a and 3b are integrally molded to the upper flange surface 21 by providing a mold for the surface with the shapes corresponding to the markings. The markings are placed in two different positions to distinguish lenses produced with different production jigs by changing their relative positions. A cavity, for example, is distinguishable by changing the relative positions of the markings according to a cavity. Specifically, for the first cavity, the markings are placed in such positions that the angle between the lines connecting the center of the lens to each of the markings is 180 degrees. For the second cavity, on the other hand, the markings are placed in circumferentially different positions in which the above angle is 120 degrees.

The markings 3a and 3b each have a shape of half-round convex. Though a concave shape can also serve as a marking, the convex shape is preferable because of ease of mold production. The markings 3a and 3b in this example have a height of 0.02 to 0.03 mm. The half-round convex shaped markings is advantageous in that mold production is easy. The shape of the marking 3 is not necessarily half-round, and it may be another shape such as a square or a cross, or it may be a shape of a letter such as an alphabet or a number. Though the markings 3a and 3b have the same shape in this example, they may have a different shape. The number of the markings 3 may be more than two. Or, it may be one if the shape varies by unit to identify such as by cavity. Further, if the lens has a marking indicating the position of a gate, checking the relative position of this marking and the marking 3 allows identification. Furthermore, one lens may have markings for identifying both a mold and a cavity. For example, the marking for identifying a mold may be two parallel convexities, while the marking for identifying a cavity may be one convexity, thereby distinguishing between the two.

Figure 2:
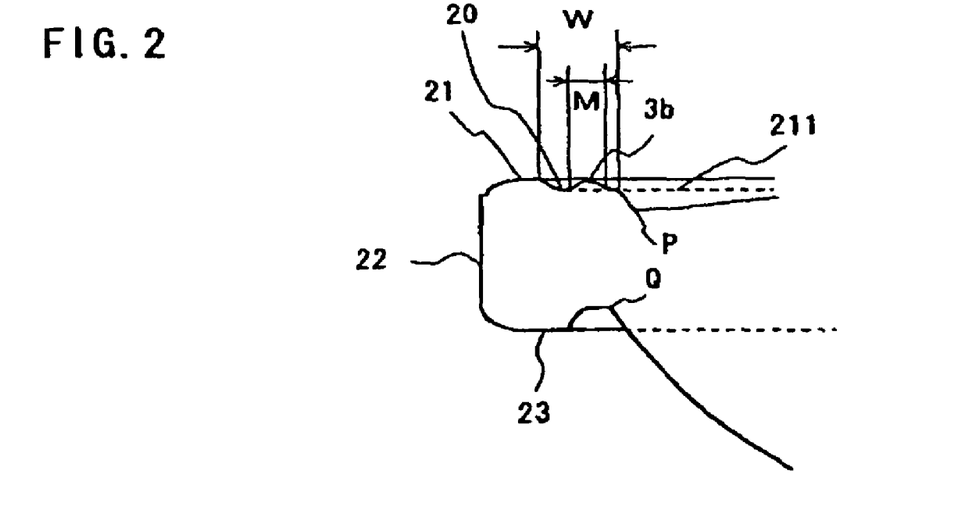
FIG. 2 is an enlarged sectional view of a flange part of a lens according to the present invention.

FIG. 2 is an enlarged sectional view of the flange part 2 of the lens 1. If the marking 3 is placed on the highest part of the upper flange surface 21 in the optical axis direction, the fine marking 3 may be broken to be invisible by abrasion with the surface where the lens is placed during the production process or by contact with an optical recording medium when the lens 1 is mounted to an optical pickup device. Further, if the marking 3 is chipped away, it may generate plastic particles or dust, which causes a problem. A solution to the above problems is to create a depressed part 20 on at least a part of the flange surface, and form the marking 3 thereon to be lower than the highest part of the upper flange surface 21. In this embodiment, the flange surface has a depressed part 20 formed in the circumferential direction, and the marking 3 is placed on the depressed part 20 so that it is lower than the highest part of the upper flange surface 21. Having the marking 3 not protruding above the upper flange surface 21, this embodiment can reduce the risk of damage by abrasion.

In the upper flange surface 21, the surface of the depressed part 20 where the marking 3b is formed is a marking surface 211. The marking surface 211 is lower than the flange surface 21 in the optical axis direction. For easier release of a molded product from a mold, the marking surface 211 is lower than the highest point of the upper flange surface 21 preferably by less than 100 μm, and more preferably by 50 μm and less. The marking surface 211 may be higher or lower than the lens surface.

The upper flange surface 21 including the marking surface 211 is mirror-finished in a polishing process of a mold member. Since a surface with a mirror finish has higher reflectivity than a surface without a mirror finish, the bright and dark contrast is great between the marking 3 and the other part. There is thus an advantage of the increased visibility of the marking 3. The mirror finish may be applied to the whole area of the upper flange surface 21 or to a limited area in the vicinity of the marking. When creating a marking on the marking surface 211, the ratio M/W of the width (M) of the bottom of the marking and the width (W) of the marking surface is preferably 2 to 10, and more preferably 2.5 to 5.

Preferably, the marking surface 211 does not extend to the outer peripheral part of the lens by forming the highest portion in the flange surface at the outer peripheral part of the marking surface 211. This prevents an adhesive from flowing thereinto to make the marking invisible.

Another solution to the problem of damage by abrasion is to place the marking 3 not on the upper flange surface 21 but on the other part outside of the optical functional part, for example, the outermost peripheral area of the lens surface. However, this has the problem that the marking 3 is blocked from view by the flange part 2. In addition, to have a large effective diameter or optical functional part, it is not preferred to place the marking 3 on the lens surface. The present embodiment thus places the marking 3 on the flange part 2. Since the marking 3 is placed on the upper flange surface 21 in this embodiment, the marking 3 is still visible after the lens 1 is attached to an optical disk apparatus.

In this embodiment, the lowest point of the upper lens surface and the highest point of the lower lens surface are not in corresponding positions as shown in FIG. 2. A boundary Q between the lower flange surface 23 and the lens surface is located at the outer side of a boundary P between the upper flange surface 21 and the lens surface. This ensures the marking surface to still have a sufficient width when the thickness of the lens is reduced and that of the flange part is reduced accordingly.

Embodiment 2

A lens according to the second embodiment of this invention is different from the lens according to the first embodiment in the shape of the flange part. Other aspects are the same as the first embodiment, and therefore same explanation will be shortened.

Figure 3:
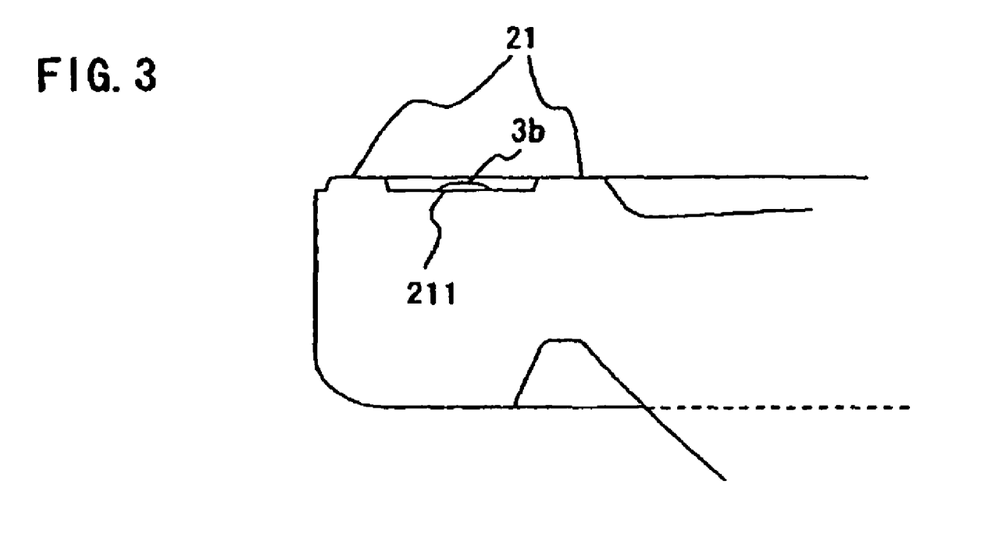
FIG. 3 is an enlarged sectional view of a flange part of a lens according to the present invention.

FIG. 3 is an enlarged sectional view of the flange part of the lens in the second embodiment of the invention. As shown therein, the flange surface has a depressed part, and the bottom surface of the depressed part is a marking surface 211. The marking surface 211 is lower than the upper flange surface 21. The marking surface 211 extends to the inner periphery of the flange part. It is also possible that the upper flange surface 21 lies on both the outer periphery and the inner periphery of the flange part with the marking surface 211 lying therebetween, as shown in FIG. 3. The height of the upper flange surface 21 at the outer and inner periphery is not necessarily equal.

The upper flange surface 21 is preferably perpendicular to the optical axis direction; however, the surface may be inclined.

In the following, a process of manufacturing the lens having the above configuration by injection molding will be briefly explained.

The process begins with creation of a mold. The mold has a shape corresponding to the shape of an article to be produced. The mold used in this embodiment has such a shape as to form a marking on the upper flange surface 21.

The next is setup of the mold in an injection molder. Then, in the injection molder, resin is injected into a cavity in the mold through a gate. The resin in the cavity then cools to solidify. A lens is thereby produced.

As described above, the lens according to this embodiment has the marking created in the most effective manner to identify a production jig such as a cavity and a mold. This provides the same advantage as the lens according to first embodiment.

Embodiment 3

A lens according to the third embodiment of this invention is different from the lens according to the first embodiment in the position of the marking. Other aspects are the same as the first embodiment, and therefore same explanation will be shorten.

Figure 4:
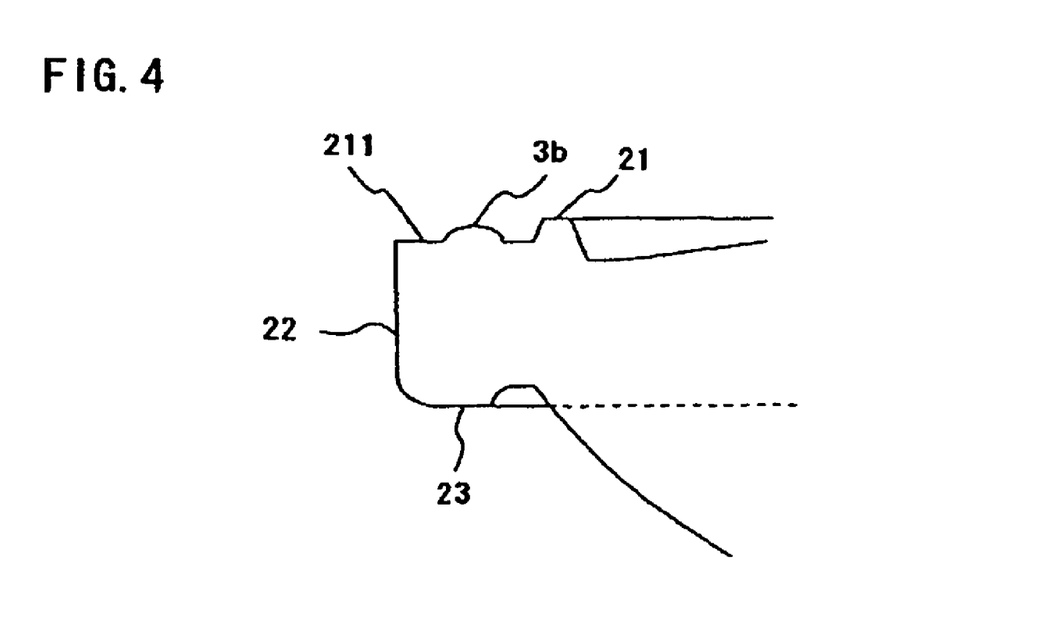
FIG. 4 is an enlarged sectional view of a flange part of a lens according to the present invention.

FIG. 4 is an enlarged sectional view of the flange part of the lens according to the third embodiment. As shown therein, the marking 3b, which is a half-round convex shape, is created on the upper flange surface 21. The marking 3b is formed to be lower than the highest part of the upper flange surface 21. In the lens according to this embodiment, the depressed part 20 is formed at the outer part of the upper flange surface 21.

As described above, the lens according to the third embodiment of this invention has the marking created in the most effective manner to identify a production jig such as a cavity and a mold. It provides the same advantage as the lens according to above embodiments.

Embodiment 4

A lens according to the fourth embodiment of this invention is different from the lens according to the first embodiment in the shape of the outer side surface of the flange part. Other aspects are the same as the first embodiment, and therefore same explanation will be shortened.

Figure 5:
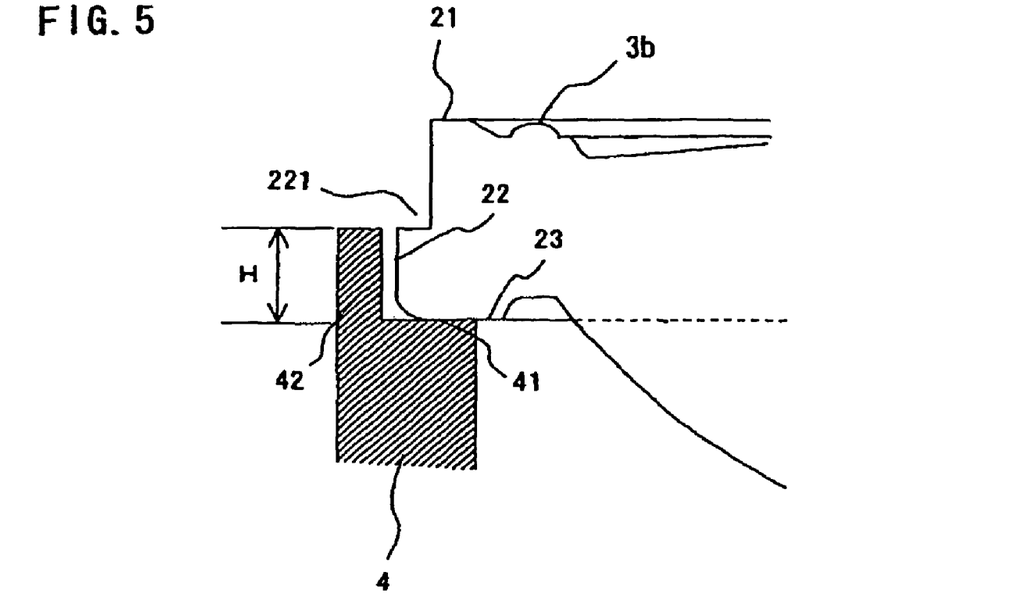
FIG. 5 is an enlarged sectional view of a flange part of a lens according to the present invention.

FIG. 5 is an enlarged sectional view of the flange part of the lens in the fourth embodiment. The lens is attached to a pickup holder 4 of an optical pickup device. As shown therein, the flange part 2 of the lens has a cutout portion 221 at its outer side surface. The cutout portion 221 has such a shape that the upper part of the outer side surface of the flange part 2 is cut away. Though the cutout portion 221 is provided on the entire periphery of the flange part 2 in this example, it is not necessarily on the entire periphery.

A pickup holder 4 holds the lens by the lower flange surface 23 and a side flange surface 22. Specifically, the pickup holder 4 has a mounting portion 41 where the lower flange surface 23 is placed and a protruding portion 42 projecting upward at the outer side of the mounting portion 41.

The bottom surface of the cutout portion 221 is at substantially the same height as the top surface of the protruding portion 42 of the pickup holder 4. In other words, the height H of the protruding portion 42 is substantially the same as the distance between the bottom surface of the cutout portion 221 and the lower flange surface 23.

The lens 1 is attached to the pickup holder 4 generally with an adhesive. The cutout portion 221 serves as an adhesive reservoir. This prevents that an adhesive flows into the area of the marking 3b to make the marking 3b invisible.

Embodiment 5

A lens according to the fifth embodiment of this invention is different from the lens according to the first embodiment in the position and shape of the marking. Other aspects are the same as the first embodiment, and hence same explanation will be shortened.

Figure 6A:
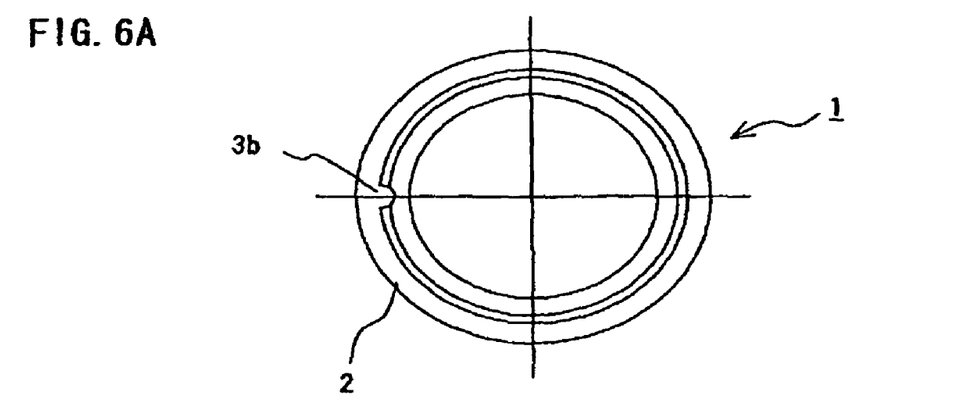
FIGS. 6A and 6B are a top plan view and a side plan view, respectively, of a lens according to the present invention.
Figure 6B:
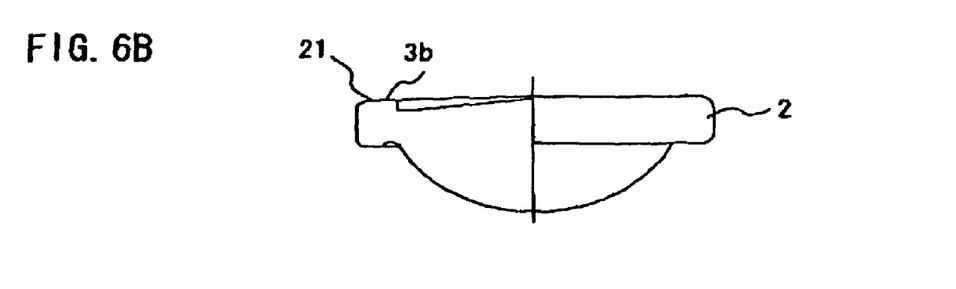

FIGS. 6A and 6B are a top plan view and a side plan view, respectively, of a lens in the fifth embodiment. As shown in FIG. 6A, the marking 3b, which is formed on the upper flange surface 21, has a convex semi cylindrical shape protruding toward the center of the lens. The upper surface of the marking 3b is at the same level as the upper flange surface 21 as shown in FIG. 6B.

As described above, the lens according to the fifth embodiment of this invention has the marking created in the most effective manner to identify a production jig such as a cavity and a mold. It thereby provides the same advantage as the lens according to the above embodiments.

The convex shape protruding toward the center of the lens is not necessarily semi cylindrical, and it may be triangular, quadrilateral, and so on.

Embodiment 6

A lens according to the sixth embodiment of this invention has the same shape as the lens according to the first embodiment. This embodiment uses inserts as some of the mold members to produce the lens. Other aspects are the same as the first embodiment, and therefore same explanation will be shortened.

Figure 7:
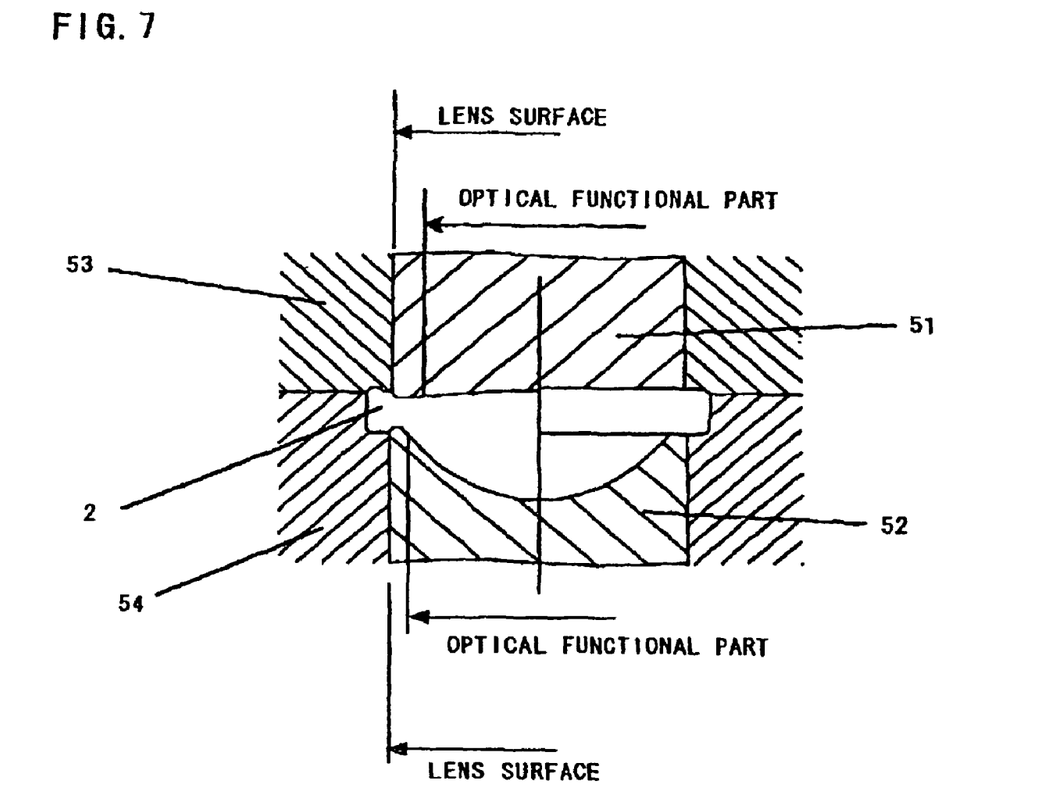
FIG. 7 is a sectional view showing production of a lens according to the present invention.

FIG. 7 is a side plan view of a lens according to the sixth embodiment of this invention. Inserts 51 and 52 are also shown therein. The inserts 51 and 52 are mold members to shape a portion including an optical functional part of the lens 1. Members 53 and 54 are mold members to shape the flange part 2. The mold members 53 and 54 are made separately from the inserts 51 and 52. On each side, mold members 51 and 53, or 52 and 54 form each side of mold part. When assembled, those mold members form a mold cavity, in which resin material is injected and molded. For the lens surface without marking, use of the insert may be eliminated. Specifically, the insert 52 may not be separated from but integrated to the mold member 54.

As known from the description, the optical functional part means the aperture of the luminous flux that actually passes through the lens, which differs according to use. For example, NA=0.45 for CD, NA=0.60 for DVD, and NA=0.85 for Blu-ray disc. The optical functional part is placed in the inner part of the lens surface.

A parting line that separates the inserts 51 and 52 from other mold members is somewhere between the outermost periphery of the optical functional part of the lens and the innermost periphery of the marking surface. Preferably, the parting line is at the inner peripheral area of the flange part 2. This is for the reasons including the following. The first is that, even if flash, which is a sharp protrusion, is formed as resin solidifies at the boundary between the inserts 51 or 52 and other mold members, it causes no problem provided it is less than the depth of the depressed part. The second reason is that, if the parting line is at the boundary between the upper flange surface 21 and the lens surface, it is difficult to apply a mirror finish to the upper flange surface 21.

The mold member 53 has a portion to define the shape of a marking at the part facing the upper flange surface 21 of the flange part. This portion allows forming the marking 3b on the flange surface by injection molding.

As described above, the insert 51 is placed in the mold to shape the optical functional part mainly. This is to facilitate the adjustment in the production of the lens 1. When producing the lens 1, a marking is integrally molded on the upper flange surface. It is thus preferred that the mold members for the optical functional part can rotate along the optical axis without changing the position of the mold members for the flange part, which has the cavity number or other marking. The use of the inserts 51 eliminates the need to create another united molding part for a marking on the flange part additionally.

For example, if the lens produced with the insert placed at a certain position turns out to be poor in quality, the lens can be reproduced after rotating the insert. The position of the insert is repeatedly adjusted until the lens quality improves.

In this embodiment, each of the mold members 53 and 54 may be composed of two or more pieces.

The present invention places a marking not on the optical functional part but on the other part of the lens. This is especially suitable for the manufacturing method that uses the inserts 51 and 52 as the mold parts to shape the optical functional part. Since the insert 51 is a separate part from the mold member 53, it reduces the risk of damaging the insert 51 during the process of forming a shape corresponding to a desired marking on the mold member 53.

Embodiment 7

A lens according to the seventh embodiment of this invention is different from the lens according to the first embodiment in the shape of the marking. Other aspects are the same as the first embodiment, and hence an explanation will be omitted.

Figure 8A:
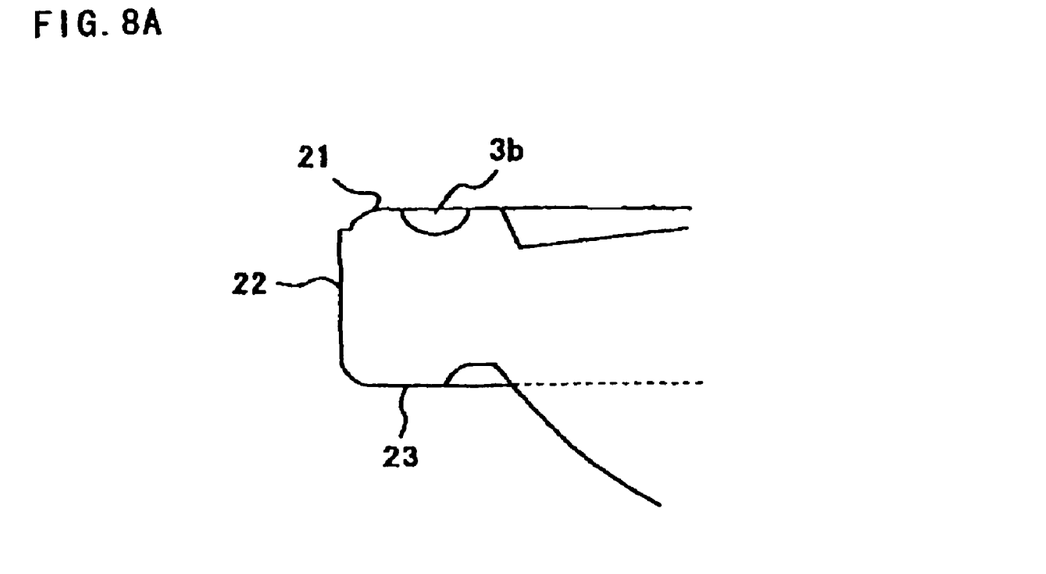
FIGS. 8A and 8B are sectional views showing production of a lens according to the present invention.
Figure 8B:
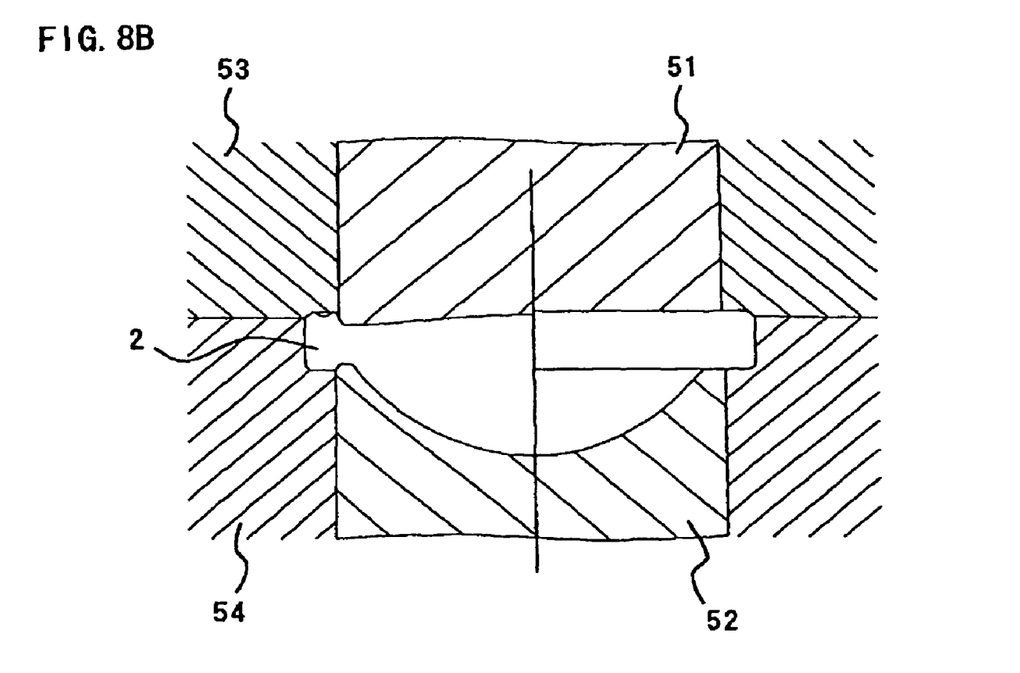

FIG. 8A is an enlarged sectional view of the flange part of the lens according to the fourth embodiment of the invention. FIG. 8B is a sectional view showing the above lens placed in the mold parts including the inserts 51 and 52. As shown therein, the marking 3b is a half-round concave shape formed on the upper flange surface 21. Since the marking 3b is depressed below the upper flange surface 21, it does not touch the surface where the lens is placed during the production process. Further, it does not touch an optical recording medium when the lens 1 is mounted to an optical pickup device. This reduces the risk of damage by abrasion with the surface or the optical recording medium.

As shown in the figure, the mold members to shape the optical functional part of the lens 1 are the inserts 51 and 52. The mold members to shape the flange part 2, on the other hand, are the mold members 53 and 54, which are made separately from the inserts 51 and 52.

Embodiment 8

The eighth embodiment of this invention relates to an optical pickup device having the lens according to one of the first to seventh embodiments.

Figure 9:
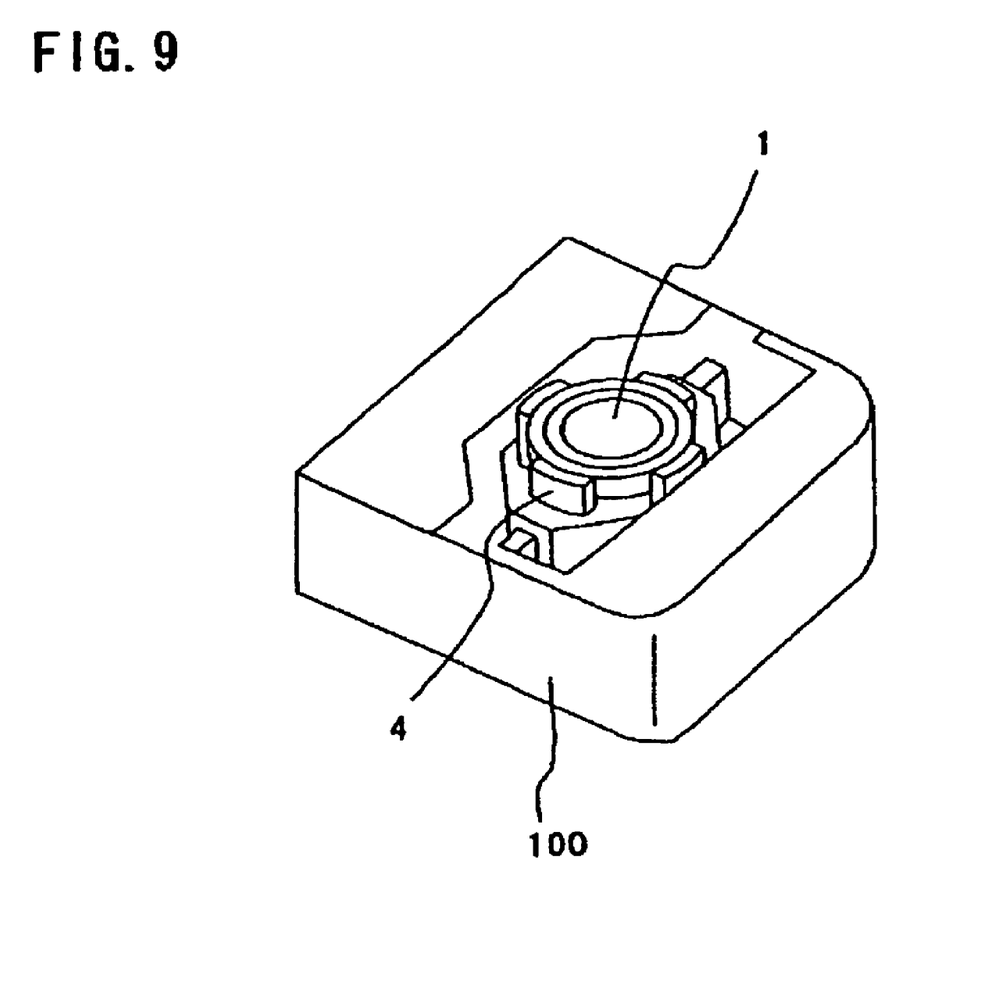
FIG. 9 is a view showing an optical pickup device according to the present invention.

FIG. 9 shows the structure of an optical pickup device 100 where the lens 1 is mounted. The lens 1 is fixed at four points with the pickup holder 4. Specifically, the flange part 2 of the lens 1 is attached to the pickup holder 4 with an adhesive.

The marking on the flange part 2 is visible to the eye with or without a hand lens when the lens 1 is mounted on the optical pickup device 100. For a lens with a certain defect, its production process can be tracked using the marking to identify a production jig, mold, production line process, production place, producer, and so on.

Another Embodiment

The lens according to the present invention may be a meniscus lens with one side convex and the other concave, for example.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing a plastic lens, the plastic lens comprising a lens part and a flange part on a periphery of the lens part, the flange part having a flange surface on at least one side of the flange part, a depressed part formed on at least a part of the flange surface, an outer portion formed on an outer side of the depressed part, and a marking on the depressed part, the method comprising the steps of:

preparing first and second molding dies, the first molding die comprising a first nested portion for forming the lens part and a second portion for forming the flange part, the first nested portion being separable against the second portion;

positioning the first and second molding dies to form a mold cavity; and injecting a resin material to the mold cavity, the marking being formed by the second portion of the first molding die, wherein the second portion has a concave portion for forming the marking on a surface thereof that corresponds to the depressed part, and a position of a deepest point of the concave portion is shallower than a point of the second portion which corresponds to a highest point of the outer part.

2. The method of manufacturing a plastic lens according to claim 1, wherein a boundary between the first portion and the second portion is positioned around an inner periphery of the flange surface.

3. The method of manufacturing a plastic lens according to claim 1, wherein a surface of the second portion around the concave portion is mirror-finished.

4. The method of manufacturing a plastic lens according to claim 1, wherein the first nested portion rotates without changing its placed position.

5. A method of manufacturing a plastic lens, the plastic lens comprising a lens part having an optical function portion and a flange part on a periphery of the lens part, the flange part having a flange surface on at least one side of the flange part, a depressed part formed on at least a part of the flange surface, an outer portion formed on an outer side of the depressed part, and a plurality of markings on the depressed part, the method comprising the steps of:

preparing first and second molding dies, the first molding die comprising a first nested portion for forming at least the optical function portion and a second portion for forming the flange part, the first nested portion being separable against the second portion;

positioning the first and second molding dies to form a mold cavity; and injecting a resin material to the mold cavity, the plurality of markings being formed by the second portion of the first molding die, wherein the second portion has a plurality of concave portions for forming the plurality of markings on a surface thereof that corresponds to the depressed part, and a position of a deepest point of the concave portions is shallower than a point of the second portion which corresponds to a highest point of the outer part.

6. The method of manufacturing a plastic lens according to claim 5, wherein the plurality of concave portions have two or more different shapes.

7. The method of manufacturing a plastic lens according to claim 5, wherein the plurality of concave portions have substantially a same shape, a first marking is formed by a single concave portion, and a second marking is formed by parallel concave portions.

8. The method of manufacturing a plastic lens according to claim 5, wherein a relative position of the plurality of concave portions is set so as to show a predetermined information of the mold cavity or the first molding die.

9. The method of manufacturing a plastic lens according to claim 5, wherein surfaces of the second portion around each of the plurality of concave portions are mirror-finished.

10. The method of manufacturing a plastic lens according to claim 5, wherein the first nested portion rotates without changing its placed position.

11. The method of manufacturing a plastic lens according to claim 7, wherein a relative position of the first and second markings is determined according to a type of production jig used to produce the plastic lens.

12. The method of manufacturing a plastic lens according to claim 7, wherein a surface of the depressed part is mirror-finished at least in a vicinity of a portion to form the first marking.

13. The method of manufacturing a plastic lens according to claim 5, wherein the boundary between the first nested portion and the second portion is positioned around an inner periphery of the flange surface.

14. The method of manufacturing a plastic lens according to claim 5, wherein the second molding die comprises a third nested portion for forming the lens part and a fourth portion for forming the flange part, the third nested portion being separable against the fourth portion, and wherein a width of the third nested portion is larger than a width of the first nested portion.

15. A method of manufacturing a plastic lens, the plastic lens comprising a lens part having an optical function portion and a flange part on a periphery of the lenst part, the flange part having a flange surface on at least one side of the flange part, and a plurality of markings, the method comprising the steps of:
preparing first and second molding dies, the first molding die having a separable nested portion for forming at least the optical function portion;
positioning the first and second molding dies to form a mold cavity; and
injecting a resin material to the mold cavity, the plurality of markings being formed by a plurality of concave portions formed on a surface of the first molding die except the nested portion,
wherein the plastic lens is used as a pick-up plastic lens, the lens part has a convex lens surface, and the flange surface comprises a first surface higher than the convex lens surface, and a second surface lower than the first surface and positioned inner than the first surface, and
the first molding die comprises a first nested portion, which is equal to the separable nested portion, and a second portion for forming the flange part, the second portion having a first concave portion for forming the marking on a surface thereof that corresponds to the second surface, a position of a deepest point of the first concave portion being shallower than a point of the second portion which corresponds to a highest point of the flange surface.

16. The method of manufacturing a plastic lens according to claim 15, wherein the first nested portion rotates without changing its placed position.

17. The method of manufacturing a plastic lens according to claim 15, wherein the second molding die comprises a third nested portion for forming the lens part and a fourth portion for forming the flange part, the third nested portion being separable against the fourth portion, and wherein a width of the third nested portion is larger than a width of the first nested portion.

18. A method of manufacturing a plastic lens, the plastic lens comprising a lens part having an optical function portion and a flange part on a periphery of the lens part, the flange part having a flange surface on at least one side of the flange part, a depressed part formed on at least a part of the flange surface, an outer portion formed on an outer side of the depressed part, and first and second markings on the depressed part, the method comprising the steps of:
preparing first and second molding dies, the first molding die having first and second concave portions for forming the first and second markings on a surface of the depressed part;
positioning the first and second molding dies to form a mold cavity; and
injecting a resin material to the mold cavity through a gate, the first and second markings being formed by the first and second concave portions of the first molding die;
wherein a position of a deepest point of the first and second concave portions is shallower than a point of the first molding die which corresponds to a highest point of the outer part, and a position of the first molding die which corresponds to the lens part is shallower than a point of the first molding die which corresponds to a highest point of the outer part.

19. The method of manufacturing a plastic lens according to claim 18, wherein the first marking indicates the position of the gate, and a relative position of the first and second markings is determined according to a type of production jig used to produce the plastic lens.

20. The method of manufacturing a plastic lens according to claim 18, wherein a surface of the depressed part is mirror-finished at least in a vicinity of a portion to form the first marking.

21. The method of manufacturing a plastic lens according to claim 19, wherein a surface of the depressed part is mirror-finished at least in a vicinity of a portion to form the first marking.

* * * * *